United States Patent  
Li et al.

(10) Patent No.: US 11,345,608 B2
(45) Date of Patent: May 31, 2022

(54) METHOD FOR PREPAREING COPPER-NICKEL COBALTATE NANOWIRE

(71) Applicant: Huizhou University, Huizhou (CN)

(72) Inventors: Hao Li, Huizhou (CN); Dongsheng Lu, Huizhou (CN); Jinyun Liao, Huizhou (CN); Xibin Zhang, Huizhou (CN)

(73) Assignee: HUIZHOU UNIVERSITY, Huizhou (CN)

( * ) Notice: Subject to any disclaimer, the term of this patent is extended or adjusted under 35 U.S.C. 154(b) by 163 days.

(21) Appl. No.: 16/747,233

(22) Filed: Jan. 20, 2020

(65) Prior Publication Data

US 2020/0148548 A1 May 14, 2020

Related U.S. Application Data

(63) Continuation of application No. PCT/CN2018/117565, filed on Nov. 27, 2018.

(30) Foreign Application Priority Data

Dec. 5, 2017 (CN) .......................... 201711266886.4

(51) Int. Cl.
*C01G 51/00* (2006.01)
*C01G 53/00* (2006.01)
(Continued)

(52) U.S. Cl.
CPC .............. *C01G 51/40* (2013.01); *B01J 37/03* (2013.01); *C01G 53/40* (2013.01); *B01J 23/005* (2013.01);
(Continued)

(58) Field of Classification Search
CPC ................................. C01G 51/40; C01G 53/40
See application file for complete search history.

(56) References Cited

FOREIGN PATENT DOCUMENTS

CN 101607743 * 12/2009 ............. C01G 51/00
CN 101717124 A * 6/2010
(Continued)

OTHER PUBLICATIONS

Michael (Role of Cu Substitution on the PseudocapacitivePerformance of Nano-Platelet shaped Spinels, NixCuzCoyO4 {x=1-z, y=2-z, z=0.2}, Electrochimica Acta 120, (2014), 350-358).*

(Continued)

*Primary Examiner* — Jun Li
(74) *Attorney, Agent, or Firm* — Hemisphere Law, PLLC; Zhigang Ma

(57) ABSTRACT

A method for preparing copper-nickel cobaltate nanowires includes steps of: (1) dissolving a soluble nickel salt, cobalt salt and copper salt in ultrapure water, and preparing same into a mixed salt solution A; (2) adding 1-4 mmol of sodium dodecyl sulfate to solution A, and dissolving same with stirring; (3) dissolving 12-30 mmol of hexamethylenetetramine in 20 mL of ultrapure water to form solution B; (4) slowly dropwise adding solution B to solution A via a separatory funnel to form solution C, and stirring same for 0.5-1 h; and (5) further transferring same into a 100 mL reaction vessel, reacting same at 100-160° C. for 8-20 h, suction filtration and washing, and drying same at 40-60° C. in a vacuum oven, and further reacting same at 350-800° C. for 1-4 h in a muffle furnace.

11 Claims, 3 Drawing Sheets

(51) Int. Cl.
- B01J 37/03 (2006.01)
- B82Y 30/00 (2011.01)
- B82Y 40/00 (2011.01)
- C01B 3/06 (2006.01)
- B01J 37/10 (2006.01)
- B01J 23/00 (2006.01)
- B01J 37/08 (2006.01)

(52) U.S. Cl.
CPC .............. *B01J 37/082* (2013.01); *B01J 37/10* (2013.01); *B82Y 30/00* (2013.01); *B82Y 40/00* (2013.01); *C01B 3/06* (2013.01); *C01P 2004/16* (2013.01)

(56) References Cited

FOREIGN PATENT DOCUMENTS

| | | | |
|---|---|---|---|
| CN | 102745752 A | * | 10/2012 |
| CN | 107867725 A | | 4/2018 |
| CN | 107867725 B | | 5/2019 |

OTHER PUBLICATIONS

Wang et al ( High performance porous nickel cobalt oxide nanowires for asymmetric supercapacitor, Nano Energy (2014) 3, 119-126).*
Machine translation of Wang'752 (CN102745752A), publication date Oct. 24, 2012.*
Machine translation of CN101717124A, Jun. 2, 2010.*
Yin et al (Ultrathin platinum nanowires grown on single-layered nickel hydroxide with high hydrogen evolution activity, Nature communications 6, Article No. 6430, 2015).*
Machine translation of CN101607743, publication date Dec. 23, 2009.*
SIPO, International Search Report, PCT Patent Application No. PCT/CN2018/117565, Pub. No. WO2019109831.
Search Report and Notification of First Office Action of CN201711266886.4.

* cited by examiner

METHOD FOR PREPAREING COPPER-NICKEL COBALTATE NANOWIRE

CROSS-REFERENCE TO RELATED APPLICATIONS

The present application is a continuation of PCT application No. PCT/CN2018/117565, filed on Nov. 27, 2018, which designates United States and claims priority of China Patent Application No. 201711266886.4, filed on Dec. 5, 2017 which is incorporated herein by reference.

BACKGROUND OF THE INVENTION

1. Technical Field

The invention relates to the technical field of compound preparation, in particular to a method for preparing copper-nickel cobaltate nanowires and application thereof as a catalyst for ammonia borane hydrolysis to produce hydrogen.

2. Description of Related Art

Nickel cobaltate ($NiCo_2O_4$) is a composite oxide with an inverse spinel structure. In recent years, various methods have been used to control the synthesis of $NiCo_2O_4$ materials having good morphology, which can be divided into physical and chemical methods. The physical method mainly includes a low-temperature crushing method, an ultrasonic crushing method, a shock wave crushing method and the like. However, the nickel cobaltate prepared by the physical method is impure and easy to have impurities. At present, the chemical method is a main method for preparing nickel cobaltate, and includes a coprecipitation method, a template method, a sol-gel method, an electrodeposition method, a hydrothermal method and a low-temperature solid phase method. The sol-gel method is wherein a metal inorganic compound is prepared into a precursor after being subjected to solution, sol, gel and curing treatment, and then the precursor is thermally treated into an oxide or other compound solid. However, it has a longer gelation process and a longer period of synthesis process, resulting in a higher production cost. Electrochemical deposition is an electrochemical method for preparing metal and its ionic films with different densities directly from aqueous solution in the experimental process. However, a large amount of electric energy needs to be consumed in the production process thereof, so that the production cost thereof is expensive, and the application thereof in industry is hindered. The low-temperature solid phase method is wherein a metal salt or a metal oxide is fully mixed and ground according to a certain proportion, then the metal salt or the metal oxide is calcined to generate a solid-phase reaction, and finally the product is obtained through grinding, so that a chemical reaction occurs on the premise of not using any solvent. However, it causes impurities mixing and structural defects caused by subsequent processing such as grinding. The coprecipitation method and the hydrothermal synthesis method can be used for preparing precursor powder in the solution, with low cost, fine and uniform product powder particles, and good morphology, which are very suitable for industrialization. Nanowire arrays, nanoplatelets, and sea urchins, graded flower shape and other morphology of nickel cobaltate have been reported.

The Chinese Patent Application 201310594484.2 (Pub. No. 103594246A, Pub. Date Feb. 19, 2014) proposes a preparation method of a porous $NiCo_2O_4$ nanowire array supercapacitor electrode material: dissolving nickel(II) nitrate hexahydrate $Ni(NO_3)_2 \cdot 6H_2O$, cobalt(II) nitrate hexahydrate $Co(NO_3)_2 \cdot 6H_2O$ and urea in water, then putting the cleaned foamed nickel into the solution, carrying out hydrothermal reaction for 3-18 h at 90-180° C., cooling to room temperature, taking out the foamed nickel, then carrying out ultrasonic washing, drying and calcining. The prepared porous $NiCo_2O_4$ nanowire array has good electrochemical stability, but the method is directly grown on a foamed nickel current collector, which is not favorable for large-scale production.

The Chinese Patent 201510204162.1 (Pub. No. 104867680A, Pub. Date Aug. 26, 2015) proposes an $NiCo_2O_4@NiCo_2O_4$ nano material used as a supercapacitor electrode and a preparation method thereof: a core structure $NiCo_2O_4$ nanowire is prepared by a hydrothermal reaction method, a shell structure $NiCo_2O_4$ nanowire is further prepared by an electrochemical deposition method on the nanowire, and finally a $NiCo_2O_4@NiCo_2O_4$ nanowire with a homogeneous core-shell structure is obtained. The invention effectively improves the specific surface area and space utilization of the electrode, and increases the specific capacitance of the electrode material, but it is obvious that the process is complicated and energy-consuming. Therefore, it is the problem to be solved by the present invention to develop a method for industrially producing a cobaltate composite with controllable morphology, low cost and excellent product performance.

BRIEF SUMMARY OF THE INVENTION

The present invention aims to provide a preparation method for synthesizing $Cu_xNi_{1-x}Co_2O_4$ nanowires by using a simple and mild hydrothermal method under the condition that a template is not used, aiming at saving energy, being economical, simple, convenient, capable of being scaled and the like.

In order to solve the above technical problem, the invention provides a method for preparing copper-nickel cobaltate nanowires comprising the steps of:
(1) dissolving a soluble nickel salt, cobalt salt and copper salt in ultrapure water, and preparing same into a mixed salt solution A;
(2) adding 1-4 mmol of sodium dodecyl sulfate to the solution A, and dissolving same with stirring;
(3) dissolving 12-30 mmol of hexamethylenetetramine in 20 mL of ultrapure water to form a solution B;
(4) slowly dropwise adding the solution B to the solution A via a separatory funnel to form a solution C, and stirring same for 0.5-1 h; and
(5) then transferring the solution C into a 100 mL reaction vessel, reacting same at 100-160° C. for 8-20 h, carrying out suction filtration and washing, drying same at 40-60° C. in a vacuum oven, and further reacting same at 350-800° C. for 1-4 h in a muffle furnace.

Preferably, a mixed salt solution A with a molar ratio 2:1 of $Co^{2+}/(Ni^{2+}, Cu^{2+})$ is prepared in the step (1).

Preferably, the soluble nickel salt in the step (1) is selected from one of nickel chloride hexahydrate, nickel sulfate heptahydrate, nickel(II) nitrate hexahydrate, nickel chloride, nickel sulfate and nickel nitrate.

Preferably, the soluble cobalt salt in the step (1) is selected from one of cobalt acetate tetrahydrate, cobalt chloride, cobalt sulfate, cobalt nitrate, cobalt chloride hexahydrate, cobalt sulfate heptahydrate, and cobalt(II) nitrate hexahydrate.

Preferably, the soluble copper salt is selected from one of copper chloride dihydrate, copper sulfate pentahydrate and copper nitrate.

The invention also discloses an application of the copper-nickel cobaltate nanowire prepared by the method as a catalyst for ammonia borane hydrolysis to produce hydrogen.

In summary, the preparation method has the following beneficial effects. 1) According to a hydrothermal synthesis method of the invention, the raw materials are firstly mixed according to a certain proportion, hexamethylenetetramine is used as a precipitant to generate a multi-element metal hydroxide, and then the multi-element metal hydroxide is calcined to synthesize the cobaltate. The process effectively realizes a nickel-cobalt-copper ratio set in the raw materials, and it is simple to operate, environmentally friendly, good in experimental reproducibility, low in cost, and easy in industrial production, and can produce a composite cobaltate $Cu_xNi_{1-x}Co_2O_4$ with a large scale. 2) The nanowire $Cu_xNi_{1-x}Co_2O_4$ composite cobaltate material prepared by the invention has excellent performance in catalyzing ammonia borane for hydrolysis to produce hydrogen. Especially, $Cu_{0.6}Ni_{0.4}Co_2O_4$ has the highest catalytic activity, the TOF value is as high as 119.5 $mol_{hydrogen}$ $min^{-1}$ $mol_{cat}^{-1}$, which is the highest value reported in the current literature. It is expected to realize industrialized preparation of a catalyst for hydrogen production.

BRIEF DESCRIPTION OF THE SEVERAL VIEWS OF THE DRAWINGS

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

Figure 1:
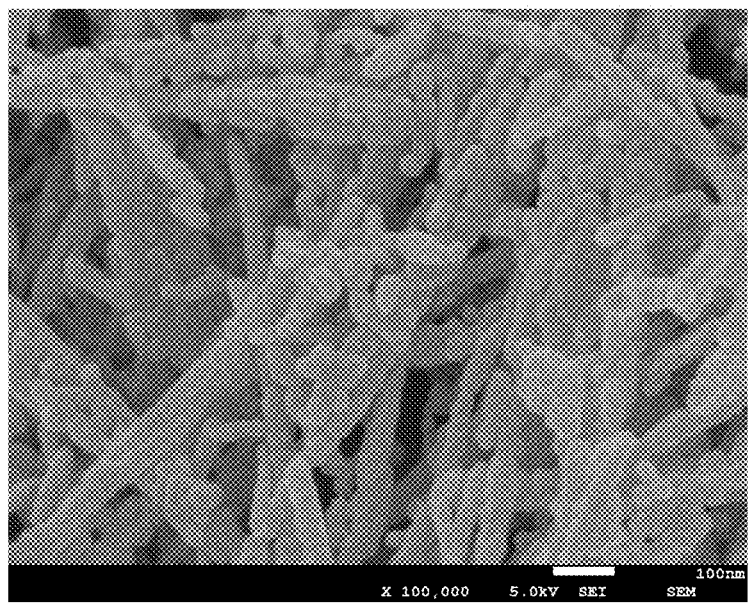
FIG. 1 is an SEM image of $Cu_{0.6}Ni_{0.4}Co_2O_4$ prepared according to the present invention.

The invention will now be described in detail through several embodiments with reference to the accompanying drawings.

First Embodiment

Preparation of a precursor: cobalt acetate (2 mmol), sodium dodecyl sulfate (2 mmol), nickel chloride (x mmol), copper chloride (1-x mmol) were dissolved in 20 mL water (0≤x≤1), and stirred magnetically until dissolved, then 1.2 M hexamethylenetetramine solution (20 mL) was added, and the obtained solution was stirred magnetically for 30 min, transferred to a reaction vessel, reacted for 12 h (hours) at 120° C. (Celsius), carried out with suction filtration and washed, and dried under a vacuum oven 40° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 600° C. at a heating rate of 2° C./min, and kept for 2 h; and after it was cooled to room temperature, a target product $Cu_xNi_{1-x}Co_2O_4$ was obtained by taking out a sample.

Through measurement, the morphology of the $Cu_xNi_{1-x}Co_2O_4$ obtained in the invention is still a nanowire structure.

Second Embodiment

Preparation of a precursor: cobalt acetate (2 mmol), sodium dodecyl sulfate (2 mmol), nickel chloride (x mmol), copper chloride (1-x mmol) were dissolved in 20 mL water (0≤x≤1), and stirred magnetically until dissolved, then 0.6 M hexamethylenetetramine solution (20 mL) was added, and the obtained solution was stirred magnetically for 30 min, transferred to a reaction vessel, reacted for 12 h at 120° C., carried out with suction filtration and washed, and dried under a vacuum oven 60° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 600° C. at a heating rate of 2° C./min, and kept for 2 h; and after it was cooled to room temperature, a target product $Cu_xNi_{1-x}Co_2O_4$ was obtained by taking out a sample.

Through measurement, the morphology of the $Cu_xNi_{1-x}Co_2O_4$ obtained in the invention is still a nanowire structure.

Third Embodiment

Preparation of a precursor: cobalt acetate (2 mmol), sodium dodecyl sulfate (4 mmol), nickel chloride (x mmol), copper chloride (1-x mmol) were dissolved in 20 mL water (0≤x≤1), and stirred magnetically until dissolved, then 1.2 M hexamethylenetetramine solution (20 mL) was added, and the obtained solution was stirred magnetically for 60 min, transferred to a reaction vessel, reacted for 12 h at 120° C., carried out with suction filtration and washed, and dried under a vacuum oven 40° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 600° C. at a heating rate of 2° C./min, and kept for 4 h; and after it was cooled to room temperature, a target product $Cu_xNi_{1-x}Co_2O_4$ was obtained by taking out a sample.

Through measurement, the morphology of the $Cu_xNi_{1-x}Co_2O_4$ obtained in the invention is still a nanowire structure.

Fourth Embodiment

Preparation of a precursor: cobalt acetate (2 mmol), sodium dodecyl sulfate (2 mmol), nickel chloride (x mmol), copper chloride (1-x mmol) were dissolved in 20 mL water (0≤x≤1), and stirred magnetically until dissolved, then 1.2 M hexamethylenetetramine solution (20 mL) was added, and the obtained solution was stirred magnetically for 30 min, transferred to a reaction vessel, reacted for 8 h at 160° C., carried out with suction filtration and washed, and dried under a vacuum oven 40° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 600° C. at a heating rate of 2° C./min, and kept for 2 h; and after it was cooled to room temperature, a target product $Cu_xNi_{1-x}Co_2O_2$ was obtained by taking out a sample.

Through measurement, the morphology of the $Cu_xNi_{1-x}Co_2O_4$ obtained in the invention is still a nanowire structure.

Fifth Embodiment

Preparation of a precursor: cobalt acetate (2 mmol), sodium dodecyl sulfate (2 mmol), nickel chloride (x mmol), copper chloride (1-x mmol) were dissolved in 20 mL water ($0 \leq x \leq 1$), and stirred magnetically until dissolved, then 1.5 M hexamethylenetetramine solution (20 mL) was added, and the obtained solution was stirred magnetically for 30 min, transferred to a reaction vessel, reacted for 20 h at 100° C., carried out with suction filtration and washed, and dried under a vacuum oven 40° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 600° C. at a heating rate of 2° C./min, and kept for 2 h; and after it was cooled to room temperature, a target product $Cu_xNi_{1-x}Co_2O_2$ was obtained by taking out a sample.

Through measurement, the morphology of the $Cu_xNi_{1-x}Co_2O_4$ obtained in the invention is still a nanowire structure.

Sixth Embodiment

Preparation of a precursor: cobalt acetate (2 mmol), sodium dodecyl sulfate (2 mmol), nickel chloride (x mmol), copper chloride (1-x mmol) were dissolved in 20 mL water ($0 \leq x \leq 1$), and stirred magnetically until dissolved, then 1.2 M hexamethylenetetramine solution (20 mL) was added, and the obtained solution was stirred magnetically for 30 min, transferred to a reaction vessel, reacted for 12 h at 120° C., carried out with suction filtration and washed, and dried under a vacuum oven 40° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 800° C. at a heating rate of 2° C./min, and kept for 2 h; and after it was cooled to room temperature, a target product $Cu_xNi_{1-x}Co_2O_2$ was obtained by taking out a sample.

Through measurement, the morphology of the $Cu_xNi_{1-x}Co_2O_4$ obtained in the invention is still a nanowire structure.

Seventh Embodiment

Preparation of a precursor: cobalt acetate (2 mmol), sodium dodecyl sulfate (2 mmol), nickel chloride (x mmol), copper chloride (1-x mmol) were dissolved in 20 mL water ($0 \leq x \leq 1$), and stirred magnetically until dissolved, then 1.2 M hexamethylenetetramine solution (20 mL) was added, and the obtained solution was stirred magnetically for 30 min, transferred to a reaction vessel, reacted for 12 h at 110° C., carried out with suction filtration and washed, and dried under a vacuum oven at 40° C. to obtain a precursor $M(OH)_2$, wherein M is one of nickel, copper and cobalt (i.e. $Ni(OH)_2$, $Cu(OH)_2$ and $Co(OH)_2$).

Preparation of nanowire-shaped $Cu_xNi_{1-x}Co_2O_4$: the dried precursor was uniformly ground in a mortar, placed in a muffle furnace, heated to 350° C. at a heating rate of 2° C./min, and kept for 2 h; and after it was cooled to room temperature, a target product $Cu_xNi_{1-x}Co_2O_2$ was obtained by taking out a sample.

Through measurement, the morphology of the $Cu_xNi_{1-x}Co_2O_4$ obtained in the invention is still a nanowire structure.

The structure and properties of the composite cobaltate prepared according to the present invention are analyzed and tested by taking nanowire $Cu_{0.6}Ni_{0.4}Co_2O_4$ as an example.

1. SEM Analysis

FIG. 1 is an SEM image of $Cu_{0.6}Ni_{0.4}Co_2O_4$ prepared according to the present invention. As can be seen from the scan diagram, the morphology of $Cu_{0.6}Ni_{0.4}Co_2O_4$ synthesized through hydrothermal synthesis is nanowires with a diameter of about 30 nm.

2. TEM Test

Figure 2:
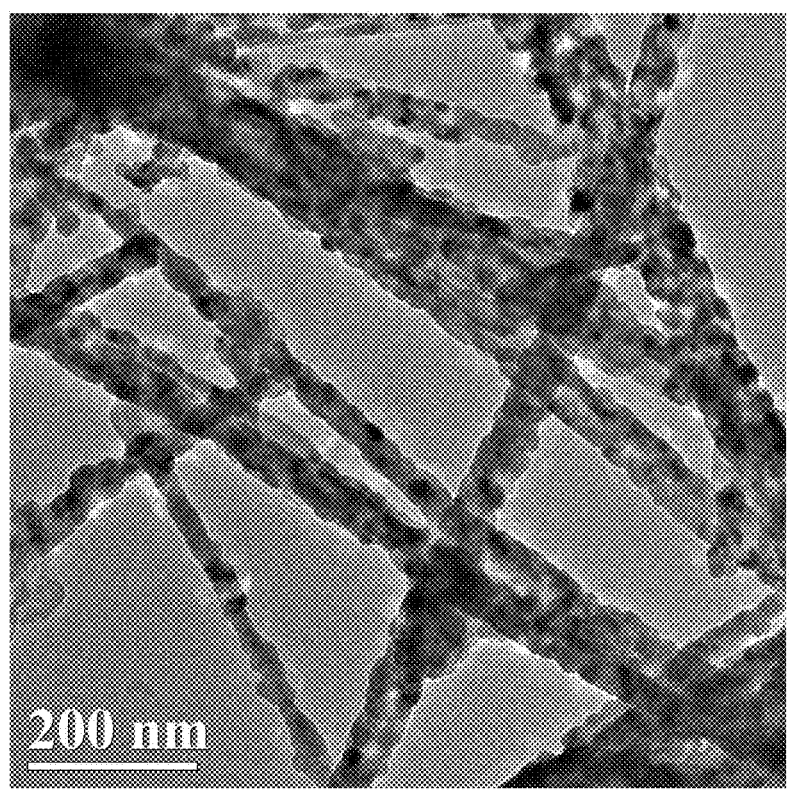
FIG. 2 is a TEM image of $Cu_{0.6}Ni_{0.4}Co_2O_4$ prepared according to the present invention.

FIG. 2 is a TEM image of $Cu_{0.6}Ni_{0.4}Co_2O_4$ prepared according to the present invention, and a nanowire-shaped catalyst can be further confirmed from the projection view.

3. BET Test

Figure 3:
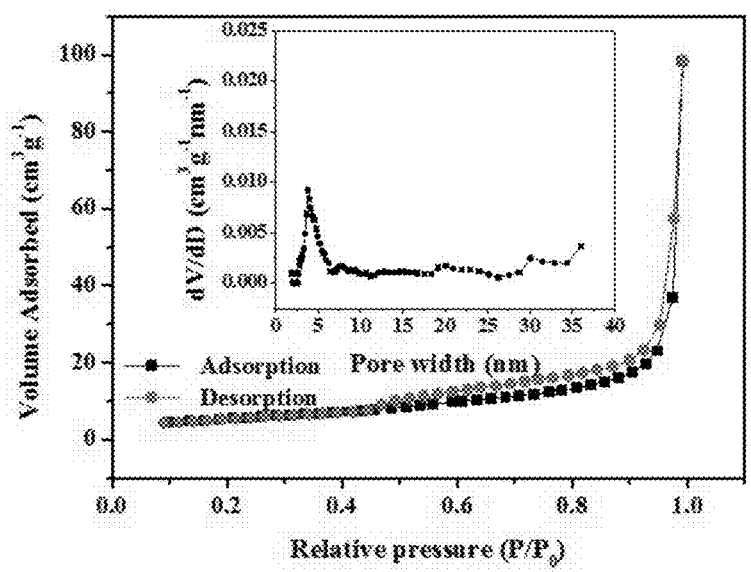
FIG. 3 is a BET test curve of $Cu_{0.6}Ni_{0.4}Co_2O_4$ prepared according to the present invention.

FIG. 3 is a nitrogen adsorption and desorption isotherm curve and a pore size distribution curve of $Cu_{0.6}Ni_{0.4}Co_2O_4$ prepared according to the present invention, and it can be seen from the figure that the isotherm is classified into a type IV isotherm, and the isotherm has an obvious hysteresis ring in the range of relative pressure of 0.45-0.98, which indicates that mesopores exist in the material. From the pore size distribution curve it can be found that the pores are mainly concentrated at 4 nm.

4. XRD

Figure 4:
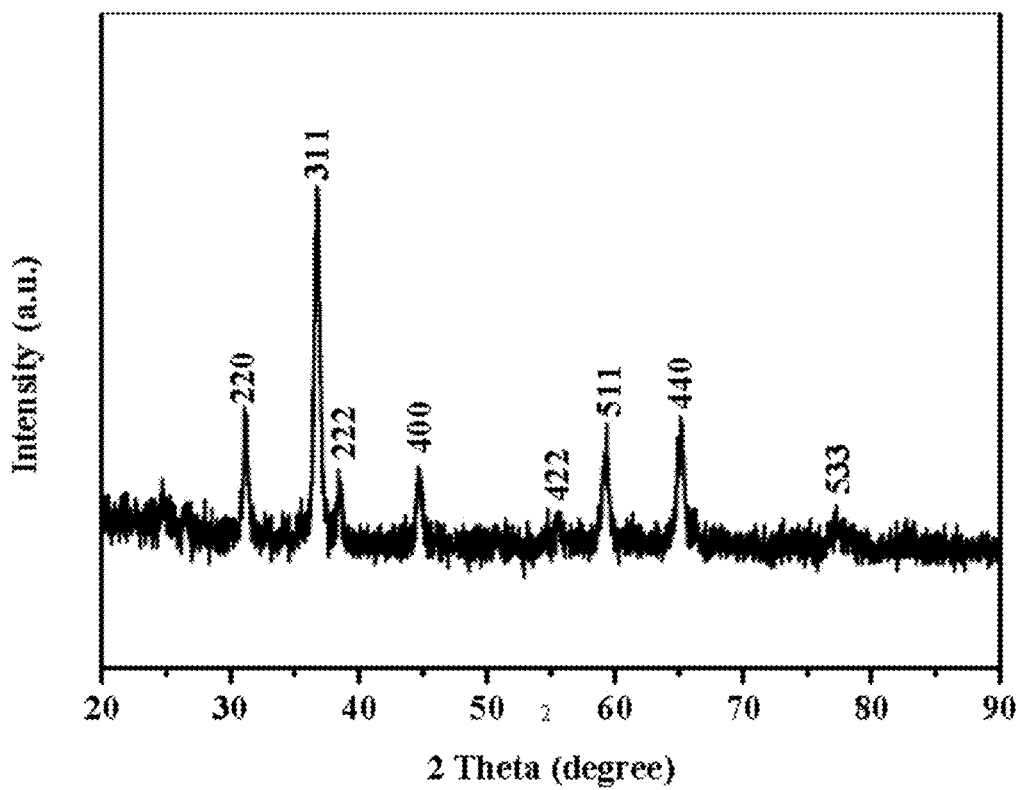
FIG. 4 is an XRD test curve of $Cu_{0.6}Ni_{0.4}Co_2O_4$ prepared according to the present invention.

FIG. 4 is an XRD test of $Cu_{0.6}Ni_{0.4}Co_2O_4$ prepared according to the present invention. The characteristic peaks of different crystal planes of $Cu_{0.6}Ni_{0.4}Co_2O_4$ are marked in the figure.

5. Test of Catalytic Performance for Hydrogen Production

Figure 5:
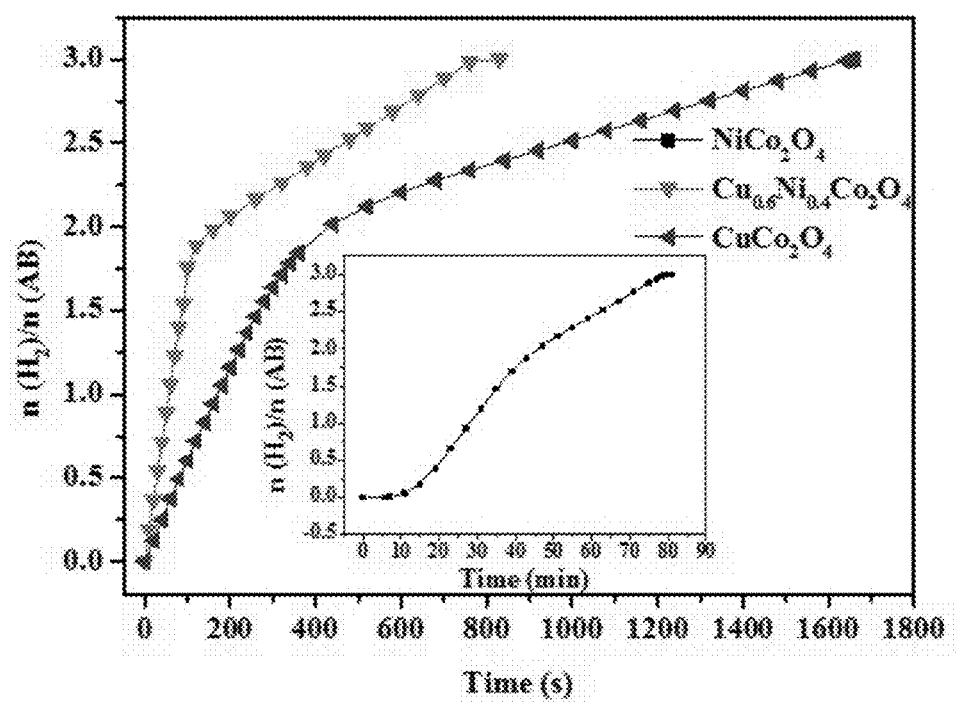
FIG. 5 is a comparison of catalytic performance for hydrogen production with $Cu_{0.6}Ni_{0.4}Co_2O_4$ and $CuCo_2O_4$, $NiCo_2O_4$ prepared according to the present invention.

FIG. 5 is a performance test of $Cu_{0.6}Ni_{0.4}Co_2O_4$ prepared according to the present invention as a catalyst for ammonia borane hydrolysis to produce hydrogen, the amount of $NH_3BH_3$ is 3 mmol, NaOH is 20 mmol, and the catalyst is 5 mg. The test showed that it produced 55 mL of hydrogen in the first minute by taking $Cu_{0.6}Ni_{0.4}Co_2O_4$ as a catalyst at 25° C., about 24 mL of hydrogen in the first minute by taking $CuCo_2O_4$ as a catalyst, and no hydrogen in the first minute by taking $NiCo_2O_4$ as a catalyst.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A method for preparing copper-nickel cobaltate nanowires, comprising steps of:
    (1) dissolving a soluble nickel salt, cobalt salt and copper salt in ultrapure water, and preparing same into a mixed salt solution A;

(2) adding 1-4 mmol of sodium dodecyl sulfate to the solution A, and dissolving same with stirring;

(3) dissolving 12-30 mmol of hexamethylenetetramine in 20 mL of ultrapure water to form a solution B;

(4) slowly dropwise adding the solution B to the solution A via a separatory funnel to form a solution C, and stirring same for 0.5-1 hour; and (5) then transferring the solution C into a 100 mL reaction vessel, reacting same at 100-160° C. for 8-20 h, carrying out suction filtration and washing, drying same at 40-60° C. in a vacuum oven, and further reacting same at 350-800° C. for 1-4 hours in a muffle furnace.

2. The method for preparing copper-nickel cobaltate nanowires according to claim 1, wherein a mixed salt solution A with a molar ratio 2:1 of $Co^{2+}/(Ni^{2+}, Cu^{2+})$ is prepared in the step (1), the molar ratio of $Co^{2+}/(Ni^{2+}, Cu^{2+})$ represents ratio of amount of $Co^{2+}$ over total amount of $Ni^{2+}$ and $Cu^{2+}$.

3. The method for preparing copper-nickel cobaltate nanowires according to claim 2, wherein the soluble nickel salt in the step (1) is selected from one of nickel chloride hexahydrate, nickel sulfate heptahydrate, nickel(II) nitrate hexahydrate, nickel chloride, nickel sulfate and nickel nitrate.

4. The method for preparing copper-nickel cobaltate nanowires according to claim 3, wherein the soluble cobalt salt in the step (1) is selected from one of cobalt acetate tetrahydrate, cobalt chloride, cobalt sulfate, cobalt nitrate, cobalt chloride hexahydrate, cobalt sulfate heptahydrate, and cobalt(II) nitrate hexahydrate.

5. The method for preparing copper-nickel cobaltate nanowires according to claim 4, wherein the soluble copper salt is selected from one of copper chloride dihydrate, copper sulfate pentahydrate and copper nitrate.

6. The method for preparing copper-nickel cobaltate nanowires according to claim 1, wherein the soluble nickel salt in the step (1) is selected from one of nickel chloride hexahydrate, nickel sulfate heptahydrate, nickel(II) nitrate hexahydrate, nickel chloride, nickel sulfate and nickel nitrate.

7. The method for preparing copper-nickel cobaltate nanowires according to claim 6, wherein the soluble cobalt salt in the step (1) is selected from one of cobalt acetate tetrahydrate, cobalt chloride, cobalt sulfate, cobalt nitrate, cobalt chloride hexahydrate, cobalt sulfate heptahydrate, and cobalt(II) nitrate hexahydrate.

8. The method for preparing copper-nickel cobaltate nanowires according to claim 7, wherein the soluble copper salt is selected from one of copper chloride dihydrate, copper sulfate pentahydrate and copper nitrate.

9. The method for preparing copper-nickel cobaltate nanowires according to claim 1, wherein the soluble cobalt salt in the step (1) is selected from one of cobalt acetate tetrahydrate, cobalt chloride, cobalt sulfate, cobalt nitrate, cobalt chloride hexahydrate, cobalt sulfate heptahydrate, and cobalt(II) nitrate hexahydrate.

10. The method for preparing copper-nickel cobaltate nanowires according to claim 9, wherein the soluble copper salt is selected from one of copper chloride dihydrate, copper sulfate pentahydrate and copper nitrate.

11. The method for preparing copper-nickel cobaltate nanowires according to claim 1, wherein the soluble copper salt is selected from one of copper chloride dihydrate, copper sulfate pentahydrate and copper nitrate.

* * * * *